United States Patent [19]

Howell

[11] Patent Number: 4,652,962
[45] Date of Patent: Mar. 24, 1987

[54] HIGH SPEED CURRENT LIMITING CIRCUIT INTERRUPTER

[75] Inventor: Edward K. Howell, Simsbury, Conn.

[73] Assignee: General Electric Company, New York, N.Y.

[21] Appl. No.: 839,399

[22] Filed: Mar. 14, 1986

[51] Int. Cl.[4] ................. H02H 3/08; H01H 51/34
[52] U.S. Cl. ......................... 361/3; 335/91; 335/147; 361/5
[58] Field of Search ...................... 361/2-8, 361/13, 54, 56, 94, 97; 307/134, 135, 137; 335/91, 101, 16, 19, 147; 200/147

[56] References Cited

U.S. PATENT DOCUMENTS

| | | | |
|---|---|---|---|
| 3,002,065 | 9/1961 | La Tour, Jr. ................. | 335/147 |
| 3,215,796 | 11/1965 | Leiji ........................... | 335/91 |
| 4,250,531 | 2/1981 | Ahrens ....................... | 361/56 X |
| 4,286,301 | 8/1981 | Pham Van ................... | 361/3 |
| 4,300,181 | 11/1981 | Premerlani ................. | 361/4 |
| 4,420,784 | 12/1983 | Chen et al. ................. | 361/7 |
| 4,459,629 | 7/1984 | Titus ........................... | 361/3 |
| 4,463,400 | 7/1984 | Paice et al. ................. | 307/135 X |
| 4,504,773 | 3/1985 | Suzuki et al. ............... | 361/3 X |

Primary Examiner—A. D. Pellinen
Assistant Examiner—A. Sonathan Wysocki
Attorney, Agent, or Firm—Richard A. Menelly; Walter C. Bernkopf; Fred Jacob

[57] ABSTRACT

Synchronous circuit interruption is provided by operation of a diversion circuit for diverting most of the circuit current away from a pair of series-connected electrical contacts over to a solid state current interrupter prior to energizing a contact operator to separate the contacts to interrupt the remaining circuit current. To ensure arcless contact separation, the contact operator is arranged electrically in series with the solid state current interrupter which ultimately dissipates the system energy within a voltage dependent element. The arrangement of the contact operator circuit in series with the solid state current interrupter synchronizes the operation of the contact operator to ensure that the contacts are separated immediately after the circuit current has become diverted.

7 Claims, 7 Drawing Figures

HIGH SPEED CURRENT LIMITING CIRCUIT INTERRUPTER

BACKGROUND OF THE INVENTION

High speed contact operating mechanisms have substantially reduced the amount of current to be interrupted upon the instant of contact separation. The reduced amount of current carried by the contacts during the instant of switching, in turn, has substantially reduced the magnitude of the arc that occurs when the contacts become separated. Previously known solid state current interruption devices arranged in parallel across the contacts transfer the current away from the contacts at the instant of contact operation and thereby allow the contacts to separate a sufficient distance, such that the arc that occurs upon separation of the contacts becomes extinguished. A supplemental series-connected switch is then opened to completely interrupt the current. So-called "virtually arcless" circuit interruption is accomplished by diverting most of the circuit current away from the contacts prior to actuating the contact operator for contact separation, such that insufficient current remains to sustain an arc of any significance. The diverted current first passes through a power transistor and then through a varistor wherein the current rapidly approaches zero.

One of the problems involved with such high speed current limiting circuit interruption is the need to ensure that the contacts do not become separated until after the current has been diverted. Some means of synchronization between the operation of the solid state current interrupter and the contact operator is required to ensure this function. One purpose of the instant invention is to provide a circuit arrangement wherein the diverted current, per se, is used to both turn on the solid state current interrupter and to activate the contact operator to separate the contacts immediately after the circuit current has been diverted.

SUMMARY OF THE INVENTION

A current diversion circuit is operably connected within a power bus containing a pair of separable contacts to divert the current away from the contacts prior to contact separation. A solid state current interrupter connected in parallel across the contacts receives the diverted current and forces the current to zero through a voltage-dependent element. A contact operator connected in series with the solid state current interrupter operates to separate the contacts as soon as the solid state current interrupter becomes operational. The diverter circuit, solid state current interrupter and contact operator are interconnected by means of discrete current transformer primary windings to provide the logic required for the synchronous operation of the individual circuit components.

BRIEF DESCRIPTION OF THE DRAWINGS

FIG. 3 is a diagrammatic representation of the current interrupter circuit within the current interrupter of FIG. 1;

FIG. 4 is a side view, in partial section, of the contact operator within the circuit interrupter of FIG. 1;

FIG. 5 is a side view in partial section of an alternate contact operator for use within the circuit interrupter of FIG. 1;

FIG. 6 is a side view in partial section of a further contact operator for use within the circuit interrupter of FIG. 1; and FIG. 7 is a top view of the magnetic operator within the contact operator of FIG. 6.

DESCRIPTION OF THE PREFERRED EMBODIMENT

Figure 1:
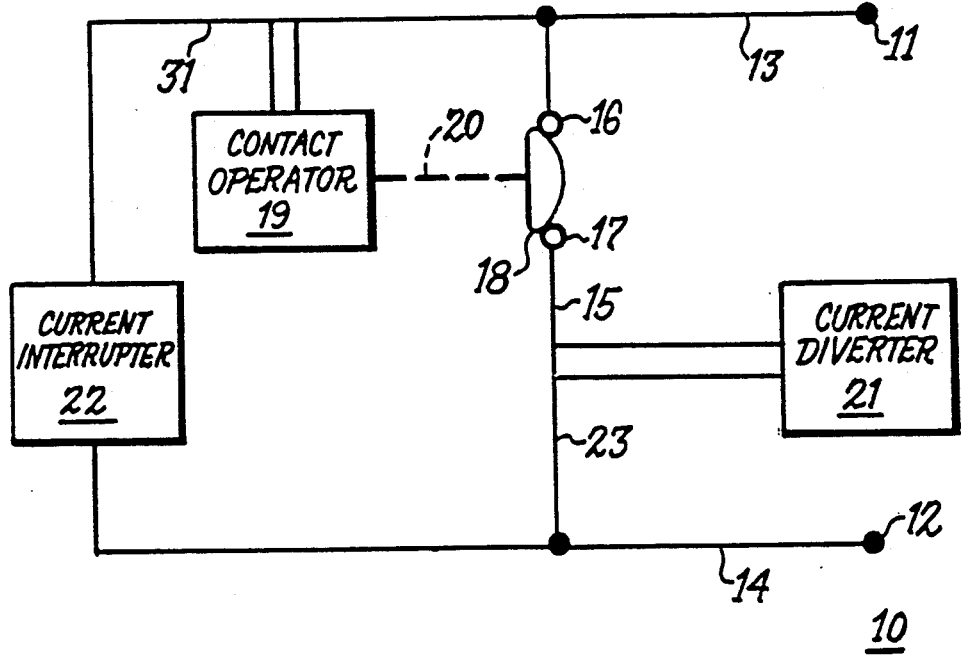
FIG. 1 is a schematic representation of the high speed current limiting circuit interrupter according to the invention.
Figure 2:
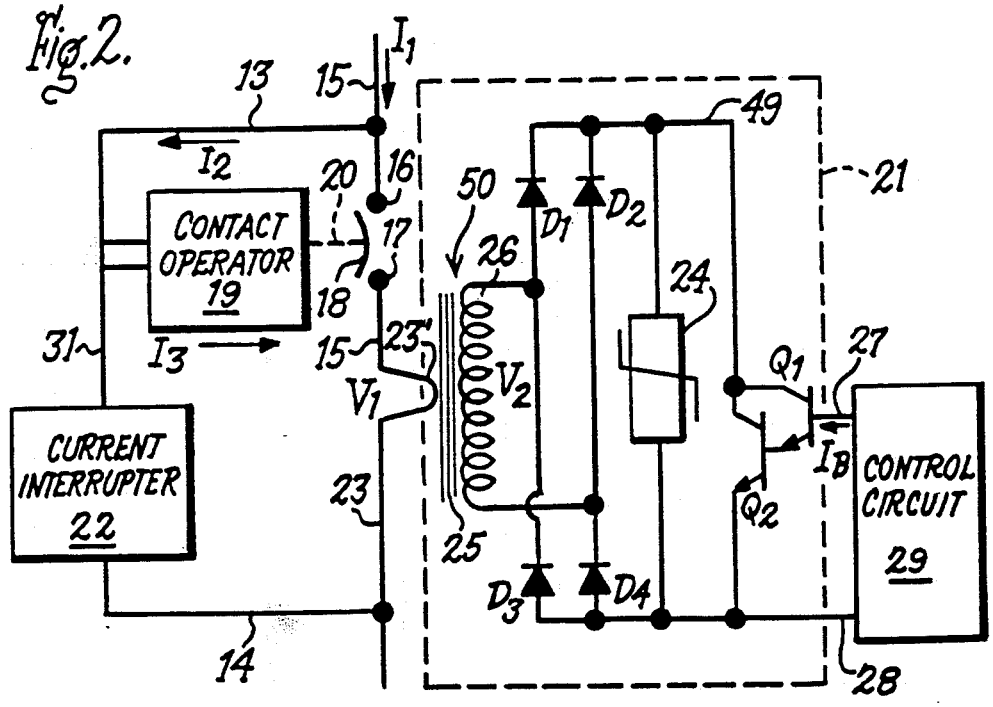
FIG. 2 is a diagrammatic representation of the diversion circuit used within the circuit interrupter of FIG. 1.

A current limiting circuit interrupter circuit 10 is shown in FIG. 1 for connection within a power systems circuit wherein a power source and load (not shown) connected across terminals 11, 12 to conductors 13, 14, 15 and 23 as indicated. Fixed contacts 16, 17 are arranged in series within the conductors for interrupting circuit current upon command. A bridging contact 18 operatively connects with a contact operator 19 by means of a contact operator control link 20. The contact operator is, in turn, connected with a current interrupter 22 by means of conductors 31 and 13. A current diverting circuit 21 is connected in series with the contacts by conductors 15 and 23. The purpose of the current diverting circuit, as described within U.S. patent application Ser. No. 753,832, filed Aug. 11, 1985, entitled "Arcless Circuit Interrupter" and illustrated in FIG. 2, is to divert the circuit current away from the fixed contacts prior to actuating the contact operator. Referring to FIG. 2, one form of the current diverting circuit 21 includes a current transformer 50, with core 25 and a secondary winding 26, which is connected at one end through a bridge rectifier D1–D4 to the collectors of transistors Q1 and Q2 and which is connected at the other end to the emitter of transistor Q2. A control circuit 29, connected with the current diverting circuit 21 by means of conductors 27, 28, turns on transistors Q1 and Q2 by a base current $I_B$ and thereby prevents voltage buildup across a varistor 24. When it is desired to transfer the current path from $I_1$ through contacts 16, 17 and 18 to $I_2$ through conductor 13, the base drive to transistor Q1 is shut off. This allows the voltage to build up across the varistor 24 and generate a voltage V2 across the secondary current winding 26 which, in turn, is reflected as a lesser voltage V1 across the primary winding 23'. The voltage $V_1$ which appears in series with the fixed contacts 16, 17, forces the current $I_1$ within the conductors 15, 23 to transfer to $I_2$ through conductor 13 to the contact operator 19 and thence through the current interrupter 22 over conductor 31.

The current interrupter 22 is illustrated in FIG. 3 and similar reference numbers to FIGS. 1 and 2 will be employed, where possible. The current interrupter includes a current transformer, represented by primary and secondary windings 14', 33 and saturable core 32, is connected within conductor 14. The primary winding 14' induces a base-emitter current in the transistor Q3 by means of secondary winding 33 and conductor 34. Transistor Q3 then turns on to first carry the circuit current until the saturable core 32 associated with the primary and secondary windings saturates, at which time Q3 turns off and allows the voltage across varistor 30 to reach its clamping voltage and become conductive. The current $I_2$ then flows through current interrupter 22, but since the system voltage is less than the varistor clamping voltage, the current through the varistor rapidly decreases to zero. After transistor Q3 becomes conductive, the current $I_2$ passes over conductor 31 through the contact operator 19 which is depicted in FIG. 4. The contact operator is connected to the conductors 13, 31 by means of primary winding 31' arranged around transformer core 37 and to which electrical connection is made by means of terminals 35, 36. The contact operator is similar to that described within U.S. patent application Ser. No. 814,865, filed Dec. 30, 1985, and entitled "High Speed Contact Driver For Circuit Interruption Device". The contact operator control link 20 comprises a pair of spaced parallel wires 39, 40 through which an induced current pulse $I_3$ flows in opposite directions to electromagnetically repulse the wires and lift the bridging contact 18 away from the fixed contacts 16, 17 as indicated in phantom. A compression spring 41 arranged between an insulated block 45 and transformer support 38 biases the bridging contact against the contact closing force provided by a tension spring 42 to facilitate the rapid lifting movement of the bridging contact. Electrical connection to conductors 13, 15 is made by means of conductors 43, 44 which are connected to the insulated support posts 46, 47 by means of screws 48.

Referring to FIGS. 1–4, the logic for sequencing the transfer of current from $I_1$ to $I_2$ and for the generation of the current pulse $I_3$ is provided by the control circuit 29. The transformer core 25 within the diversion circuit 21 is designed to ensure that the transformer core does not saturate in the time required for the contacts to separate. The transformer core 32 within the current interrupter circuit 22 is specifically selected to saturate within a predetermined time to turn off transistor Q3 after the contacts have separated and to allow the voltage across the varistor 30 to increase to its clamping voltage.

A contact operator 19 is shown in FIG. 5 wherein the current transformer 37 of FIG. 4 is eliminated and electrical connection of conductors 13, 31 with wire segments 39, 40 is made directly by connection with terminals 35, 36. This allows the current $I_2$ to electromagnetically repel the wire segments and lift the bridging contact 18 out of electrical connection between fixed contacts 16, 17 as indicated. An insulating tube 51 is fastened to the bridging contact 18 and the wire is passed through the tube to prevent electrical connection between the wire and the fixed contacts.

Referring now to FIG. 6, a contact operator 52 with the conductors 43, 44 electrically connected by means of the bridging contact 18 utilizes a magnetic operator 63 to drive the bridging contact out of electrical connection with the fixed contacts 16, 17. A pair of spring-like wires 53, 54 are bowed to provide contact closing force between the bridging and fixed contacts and the current $I_2$ can be optionally applied to the spring-like wires by means of terminals 55, 56 where indicated. The spring-like wires extend through a slot 59 within a magnetic structure 57 consisting of a plurality of slotted laminations 58. The magnetic structure enhances the magnetic force on the spring-like wires and increases their electromagnetic repulsion. The spring-like wires are attached to an insulative block 60 which in turn is fastened to one end of an insulative support post 61 by means of bolt 62. The other end of the support post is fastened to the conductor 44 by means of a separate bolt 62. Preferably, however, $I_2$ is applied to terminals 66, 67 attached to the ends of the labyrinth conductor 65 arranged within the magnetic stator 72 to excite the stator and magnetically attract the armature plate 64 in the indicated direction. A hole 68, arranged perpendicular to the magnetic plate and stator, guides the driving pin 69 arranged within the hole and the armature rapidly forces the driving pin against the bridging contact causing the bridging contact to assume the open position indicated in phantom. An insulative cap 70 at the end of the driving pin prevents current from passing between the bridging contact and the magnetic operator. The arrangement of the labyrinth conductor 65 within the magnetic stator 72 is shown in FIG. 7, wherein the magnetic operator 63 is shown with the armature plate removed. The perpendicular arrangement of the driving pin 69 within hole 68 allows the armature to move the driving pin under the optimum magnetic field generated within the stator by the labyrinth conductor arrangement.

It has thus been shown that virtually arcless contact separation and circuit interruption can be achieved by means of a controlled diverter circuit in combination with a high speed contact operator and current interrupter whereby the circuit current first diverts away from the contacts over to the current interrupter before activating the contact operator to interrupt the circuit.

Having thus described my invention, what I claim as new and desire to secure by Letters Patent is:

1. A circuit interrupter comprising:
a pair of separable contacts said separable contacts comprising a pair of fixed contacts and a bridging contact;
diversion circuit means electrically connected in series with said contacts for diverting circuit current away from said contacts prior to separation to prevent an arc from forming between said contacts upon separation;
current interrupter circuit means connected in parallel with said contacts and said diversion circuit for conducting said diverted circuit current and for subsequently interrupting said circuit current; and
means for separating said contacts to interrupt a remainder of said circuit current, said means for separating said contacts comprising an electrical conductor in series with said interrupter circuit and arranged in an electromagnetic contact operator for operating said contacts after said circuit current is diverted away from said contacts, said contact operator comprising a pair of spaced electrical conductors electrically connected in series and attached at one end to said bridging contact for lifting said bridging contact upon electromagnetic repulsion between said spaced electrical conductors.

2. The circuit interrupter of claim 1 wherein said interrupter circuit means comprises a transistor and a varistor electrically connected together in parallel with each other.

3. A circuit interrupter comprising:
a pair of separable contacts;
diversion circuit means electrically connected in series with said contacts for diverting circuit current away from said contacts prior to separation to prevent an arc from forming between said contacts upon separation;
current interrupter circuit means connected in parallel with said contacts and said diversion circuit for conducting said diverted circuit current and for subsequently interrupting said circuit current;
means for separating said contacts, said means for separating said contacts comprising an electrical conductor in series with said interrupter circuit and arranged in an electromagnetic contact operator for operating said contacts after said circuit current is diverted away from said contacts; and a current transformer having a primary winding in series with said interrupter circuit and a secondary winding connected to said conductor of said operator for electrical isolation of said operator.

4. A circuit interrupter comprising:

a pair of separable contacts carrying circuit current and a bridging contact across said separable contacts;

a contact operator connecting with said bridging contact at one end for lifting said bridging contact away from said separable contacts to interrupt said circuit current, said contact operator comprising a pair of spaced wires arranged for electromagnetic repulsion;

a diverter circuit including a current transformer having a primary winding connected in series with said separable contacts and a secondary winding connected in parallel with a transistor and varistor whereby said primary winding induces an impedance in circuit with said separable contacts to transfer said circuit current;

a current interrupter circuit connected in parallel with said separable contacts for conducting said circuit current away from said separable contacts before lifting said bridging contact to deter the formation of an arc between said bridging contact and said separable contacts, said interrupter circuit including a second varistor and a second transistor electrically connected in parallel with each other and in parallel with said separable contacts; and a second current transformer having an additional primary winding connected in series with said second varistor and said second transistor and having an additional secondary winding connected in series with said pair of spaced wires whereby circuit current through said diverter circuit energizes said current transformer to provide an output current through said pair of spaced wires to electrodynamically repulse said spaced wires and lift said bridging contact away from said separable contacts when said current flows through said diverter circuit.

5. A circuit interrupter comprising:

a pair of separable contacts, said separable contacts comprising a pair of fixed contacts and a bridging contact:

diversion circuit means electrically connected in series with said contacts for diverting circuit current away from said contacts prior to separation to prevent an arc from forming between said contacts upon separation;

current interrupter circuit means connected in parallel with said contacts and said diversion circuit for conducting said diverted circuit current and for subsequently interrupting said circuit current; and means for separating said contacts to interrupt a remainder of said circuit current, said means for separating said contacts comprising an electrical conductor in series with said interrupter circuit and arranged in an electromagnetic contact operator for operating said contacts after said circuit current is diverted away from said contacts said contact operator comprising a magnetic stator having a labyrinth conductor therein and an armature plate proximate said stator, whereby a driving pin intermediate said bridging contact becomes contacted by said armature plate to lift said bridging contact away from said fixed contacts when a current pulse is applied to said labyrinth conductor.

6. A circuit interrupter comprising:

a pair of separable contacts, said separable contacts comprising a pair of fixed contacts and a bridging contact:

diversion circuit means electrically connected in series with said contacts for diverting circuit current away from said contacts prior to separation to prevent an arc from forming between said contacts upon separation;

current interrupter circuit means connected in parallel with said contacts and said diversion circuit for conducting said diverted circuit current and for subsequently interrupting said circuit current; and means for separating said contacts to interrupt a remainder of said circuit current, said means for separating said contacts comprising an electrical conductor in series with said interrupter circuit and arranged in an electromagnetic contact operator for operating said contacts after said part of said circuit current is diverted away from said contacts said spaced electrical conductors being arranged within a slot defined within a plurality of magnetic laminations to enhance electromagnetic repulsion of said spaced electrical conductors.

7. The circuit interrupter of claim 1 wherein said spaced electrical conductors are bowed away from said other to provide contact closing force between said bridging contact and said fixed contacts.

* * * * *